United States Patent
Karve et al.

(10) Patent No.: US 9,274,818 B2
(45) Date of Patent: Mar. 1, 2016

(54) RELIABLE AND SCALABLE IMAGE TRANSFER FOR DATA CENTERS WITH LOW CONNECTIVITY USING REDUNDANCY DETECTION

(71) Applicant: International Business Machines Corporation, Armonk, NY (US)

(72) Inventors: Alexei A. Karve, Mohegan Lake, NY (US); Andrzej Kochut, Croton-on-Hudson, NY (US); Hidayatullah Shaikh, Shrub Oak, NY (US); Curtis E. Hrischuk, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 13/760,125

(22) Filed: Feb. 6, 2013

(65) Prior Publication Data

US 2014/0222953 A1    Aug. 7, 2014

(51) Int. Cl.
| | |
|---|---|
| H04L 29/06 | (2006.01) |
| G06F 9/455 | (2006.01) |
| G06F 11/14 | (2006.01) |
| G06F 9/46 | (2006.01) |
| G06F 9/48 | (2006.01) |

(52) U.S. Cl.
CPC ........... *G06F 9/455* (2013.01); *G06F 9/461* (2013.01); *G06F 9/4856* (2013.01); *G06F 11/1484* (2013.01); *G06F 2009/4557* (2013.01)

(58) Field of Classification Search
CPC ............ H04L 65/4061; G06F 2009/4557; G06F 9/455; G06F 11/1484
USPC ............................................ 709/217
See application file for complete search history.

(56) References Cited

U.S. PATENT DOCUMENTS

| | | | |
|---|---|---|---|
| 7,433,869 B2 | 10/2008 | Gollapudi | |
| 7,685,185 B2 | 3/2010 | Ramasubramanian et al. | |
| 8,239,609 B2 | 8/2012 | Hudzia et al. | |
| 2006/0282457 A1* | 12/2006 | Williams | H03M 7/30 |
| 2010/0312805 A1 | 12/2010 | Noonan, III | |
| 2011/0040732 A1 | 2/2011 | Anglin et al. | |
| 2011/0047133 A1 | 2/2011 | Alpern et al. | |

(Continued)

OTHER PUBLICATIONS

Kochut, A. and Karve, A., Leveraging local image redundancy for efficient virtual machine provisioning, Apr. 2012, Network Operations and Management Symposium (NOMS), IEEE, pp. 179-187.*

(Continued)

*Primary Examiner* — Nicholas Taylor
*Assistant Examiner* — Chong G Kim
(74) *Attorney, Agent, or Firm* — Louis J. Percello; Reza Sarbakhsh

(57) ABSTRACT

A system and method for efficiently transferring virtual machine images across nodes in a cloud computing environment, includes analyzing each image on each node to create hash code clusters and a similarity matrix. An instruction to transfer an image from a source node to a target node is received. The clusters and the similarity matrix are used to determine to what extent the data from the image is already on the source node, or on any other node, and further determines the cost and speed of transferring such data to the target node. An optimal transfer plan is generated, and data that is not already on the target node is transferred to the target node from the most efficient node on which it is available, according to the optimal transfer plan.

24 Claims, 6 Drawing Sheets

| Cluster identifier | Image type identifier | | | Cluster size (MB) |
|---|---|---|---|---|
| | 3 | 2 | 1 | |
| CL-01 | 1 | 0 | 0 | 631 |
| CL-02 | 0 | 1 | 0 | 352 |
| CL-03 | 0 | 0 | 1 | 85 |
| CL-04 | 0 | 1 | 1 | 376 |
| CL-05 | 1 | 1 | 0 | 128 |
| CL-06 | 1 | 1 | 1 | 473 |

(56) References Cited

U.S. PATENT DOCUMENTS

| 2011/0219372 | A1* | 9/2011 | Agrawal et al. ............... 718/1 |
| 2012/0005308 | A1 | 1/2012 | Cok |
| 2012/0047223 | A1 | 2/2012 | Tarkoma |
| 2012/0173656 | A1 | 7/2012 | Sorenson, III |
| 2012/0192175 | A1* | 7/2012 | Dorai et al. ............... 718/1 |
| 2012/0243795 | A1* | 9/2012 | Head et al. ............... 382/218 |

OTHER PUBLICATIONS

Kulkarni, P. and et al., Redundancy elimination within large collections of files, Jun. 2004, USENIX Annual Technical Conference, pp. 59-72.*

Mell et al, "The NIST Definition of Cloud Computing", Version 15, Oct. 7, 2009, 3 pgs, Dec. 28, 2012, http://www.nist.gov/itl/cloud/upload/cloud-def-v15.pdf.

Jafari et al., "Maximizing Download Bandwidth for File Sharing in BitTorrent-like Peer-to-Peer Networks", 2008 14th IEEE International Conference on Parallel and Distributed Systems, pp. 344-350.

Wood et al., "CloudNet: A Platform for Optimized WAN Migration of Virtual Machines", University of Massachusetts, Technical Report 2010-002, pp. 1-14.

Harks, "Utility Proportional Fair Bandwidth Allocation: An Optimization Oriented Approach", LNCS 3375, pp. 61-74, 2005.

Sapuntzakis et al., "Optimizing the Migration of Virtual Computers", 5th Symposium on Operating Systems Design and Implementation, SIGOPS Operating Systems Review, vol. 36, Issue SI, Dec. 2002, pp. 377-390.

* cited by examiner

RELIABLE AND SCALABLE IMAGE TRANSFER FOR DATA CENTERS WITH LOW CONNECTIVITY USING REDUNDANCY DETECTION

FIELD OF THE INVENTION

Embodiments of the invention generally relate to cloud computing, and more particularly, to transferring virtual machine images between datacenters.

BACKGROUND

Cloud computing is a relatively new IT delivery model that is expected to grow significantly in at least the next decade. It allows specialized providers in the IT industry to offer their customers various types of services, ranging from Infrastructure-as-a-Service (IaaS), which offers remote access to computing resources such as virtual machines (VMs), and storage, to Software-as-a-Service (SaaS), which offers fully managed software functionality These types of services allow labor, hardware, software and system management costs to be shared; they reduce overall costs and make such services more affordable for both individual and enterprise consumers. Cloud computing also allows a new generation of IT services to develop, which can be more easily integrated and delivered. More specifically, it significantly builds on the potential for both virtualization technology and broad scale automation to minimize delivery costs while maintaining a high quality of service.

Large cloud computing service providers, and IaaS providers in particular, tend to deliver their services out of multiple worldwide datacenters. Consequently, substantial collections of data must be made available on more than one datacenter, and therefore may need to be transferred between datacenters across the cloud architecture. A key type of such data collections is a VM image.

There are many scenarios under which a VM image may require transferring from one datacenter to another. For example, VM images may need to be transferred between datacenters in a public cloud where a service provider offers a new or updated catalog of base images; or where a client determines that a particular captured or snapshot image is needed for high availability. As a further example, VM images may require transferring where VM images are to be hosted on different cloud and/or hypervisor, such as when a customer decides to change service providers. As yet a further example, software developers may use a different datacenter, or a different cloud, for each of the development/testing, staging, and production phases of a DevOps process, and may therefore need VM images transferred from one datacenter/cloud to another. As a final example, VM images may require transferring between a customer's systems on a private cloud (for backup storage, or extended functionality) to a public cloud, in a hybrid cloud environment.

Crude or inefficient transfer methods, such as simply transferring all of a VM image's constituent data blocks, require a lot of time and bandwidth. As cloud computing environments and the size of VM images grow to meet demand, the efficient and optimal transfer of such data across the cloud becomes critical.

An intelligent, efficient, and cost-effective solution for transferring VM images across a cloud environment takes advantage of the significant degree of similarity typically seen across images in VM libraries. This similarity is due, in large part, to the fact that many software packages, such as operating system libraries, configuration settings, and in many cases, user data, are very similar across multiple VM images. It is therefore desirable to employ a solution that takes advantage of these similarities.

SUMMARY

Aspects of the present invention provide a method, system, and program product for transferring a selected virtual machine image from a source node to a target node in a multi-node system, by analyzing all virtual machine images present on the system and generating a similarity matrix comprised of clusters, each cluster corresponding to a data block set that may be shared by one or more other virtual machine images; selecting a virtual machine image for transfer, identifying a plurality of data block sets on in the selected virtual machine image for transfer to the target node, using the similarity matrix; transferring the plurality of data block sets according to an optimal transfer plan; and reconstituting the selected virtual machine image on the target node using at least the transferred data block sets.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Figure 1:
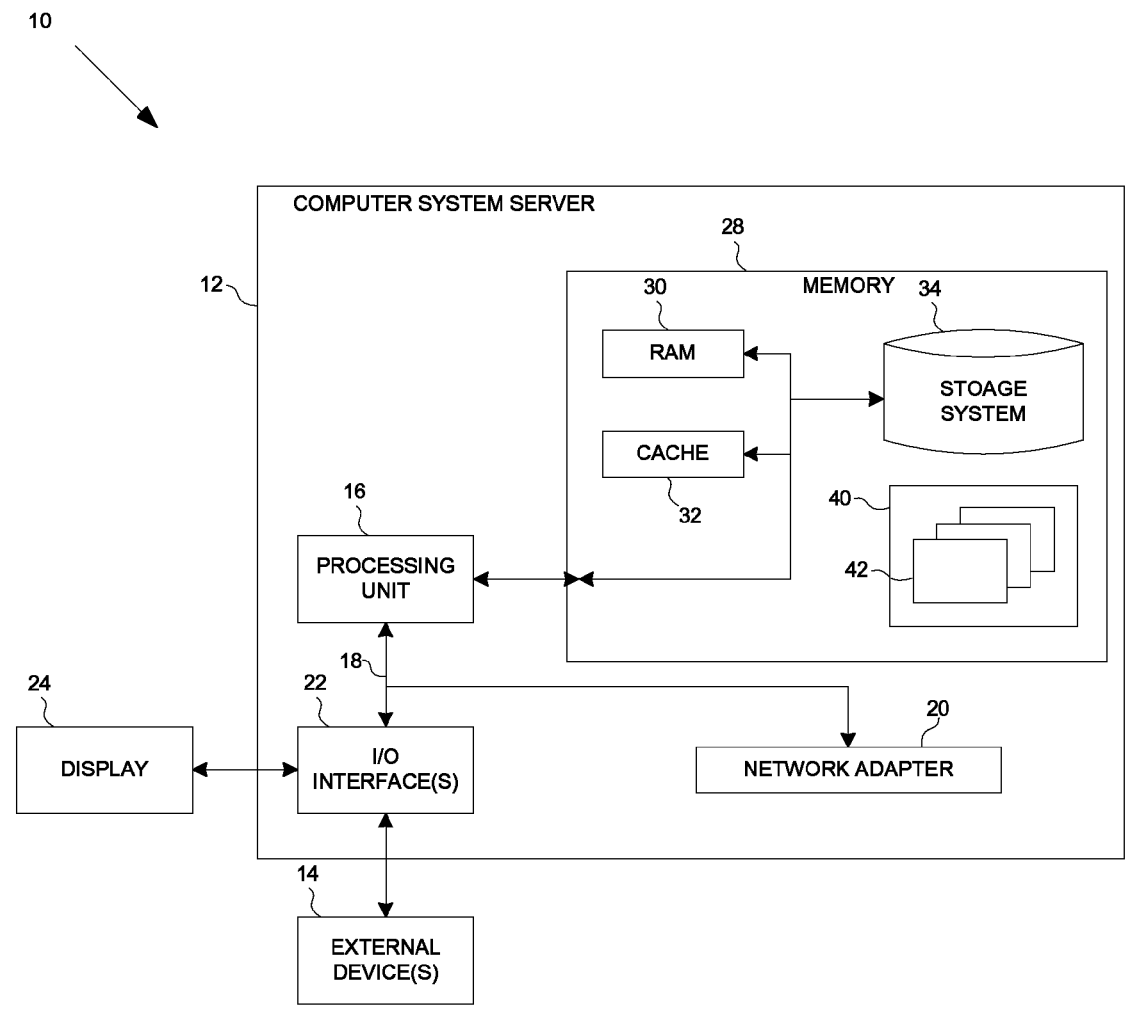
FIG. 1 is a schematic block diagram of an embodiment of a computer system for implementing a method according to an embodiment of the invention.

It is understood that although this disclosure includes a detailed description including cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows. On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows. Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but as control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows. Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an exemplary cloud computing node is shown. The cloud computing node 10 is one example of a suitable cloud computing node and is not intended to suggest any limitation as to the scope of use or functionality of embodiments of the invention described herein. Regardless, the cloud computing node 10 is capable of being implemented and/or performing any of the functionality set forth hereinabove.

In the cloud computing node 10, shown in FIG. 1, a computer system/server 12, which is operational with numerous other general purpose or special purpose computing system environments or configurations. Examples of well-known computing systems, environments, and/or configurations that may be suitable for use with the computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system/server 12 in the cloud computing node 10 is shown in the form of a general-purpose computing device. The components of the computer system/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 12 typically includes a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/non-volatile computer system storage media. By way of example only, the storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 18 by one or more data media interfaces. As will be further depicted and described below, the memory 28 may include at least one program product having a set (e.g., at least one) of program modules that are configured to carry out the functions of embodiments of the invention.

The program/utility 40, having a set (at least one) of program modules 42, may be stored in the memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. Still yet, computer the system/server 12 can communicate with one or more networks such as a local area network (LAN), a general wide area network (WAN), and/or a public network (e.g., the Internet) via a network adapter 20. As depicted, the network adapter 20 communicates with the other components of the computer system/server 12 via the bus 18. It should be understood that although not shown, other hardware and/or software components could be used in conjunction with the computer system/server 12. Examples, include, but are not limited to: microcode, device drivers, redundant processing units, external disk drive arrays, RAID systems, tape drives, and data archival storage systems, etc.

Figure 2:
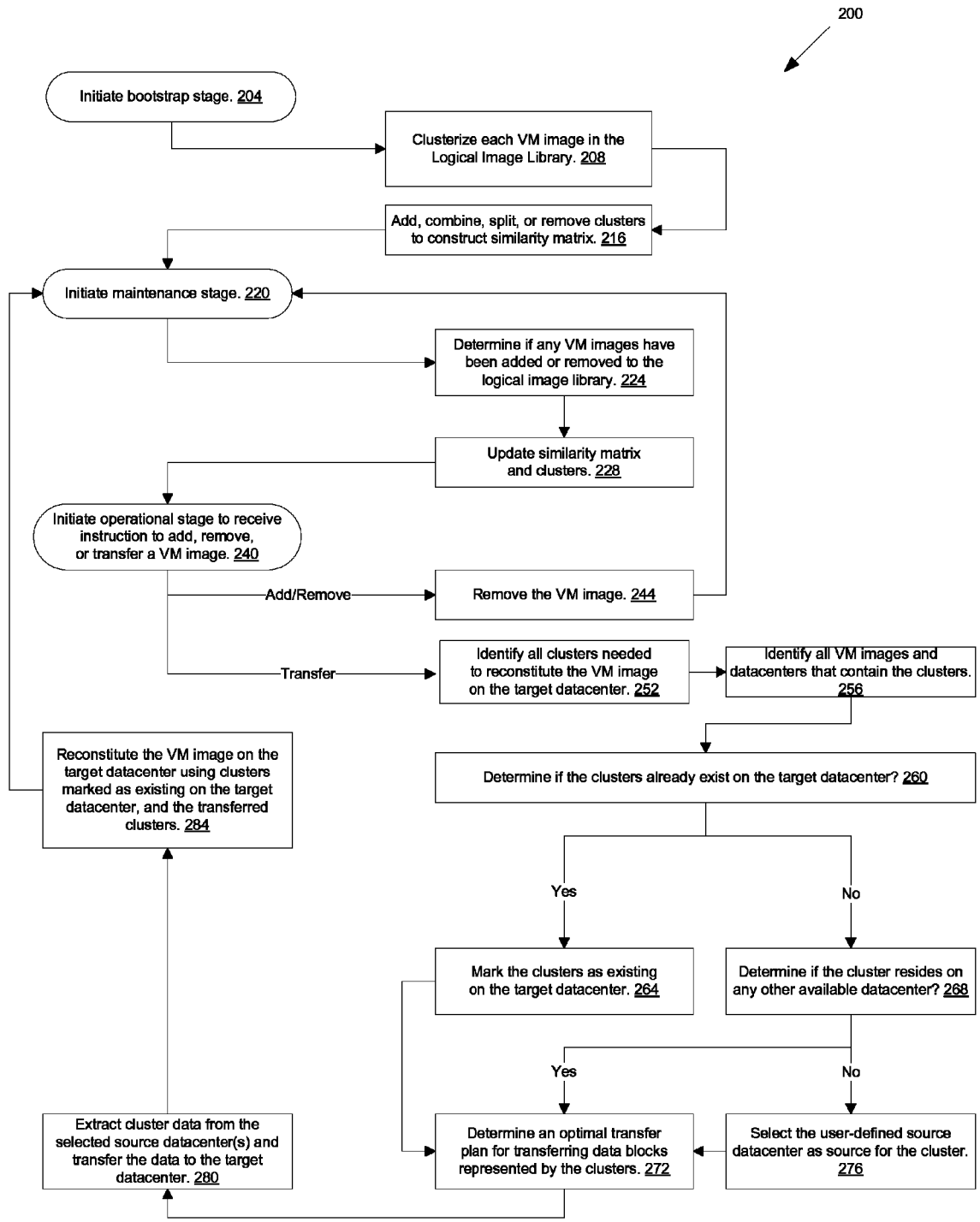
FIG. 2 is a flow chart depicting the steps of transferring a virtual machine image from a source node to a target node in accordance with an embodiment of the invention.
Figure 3:
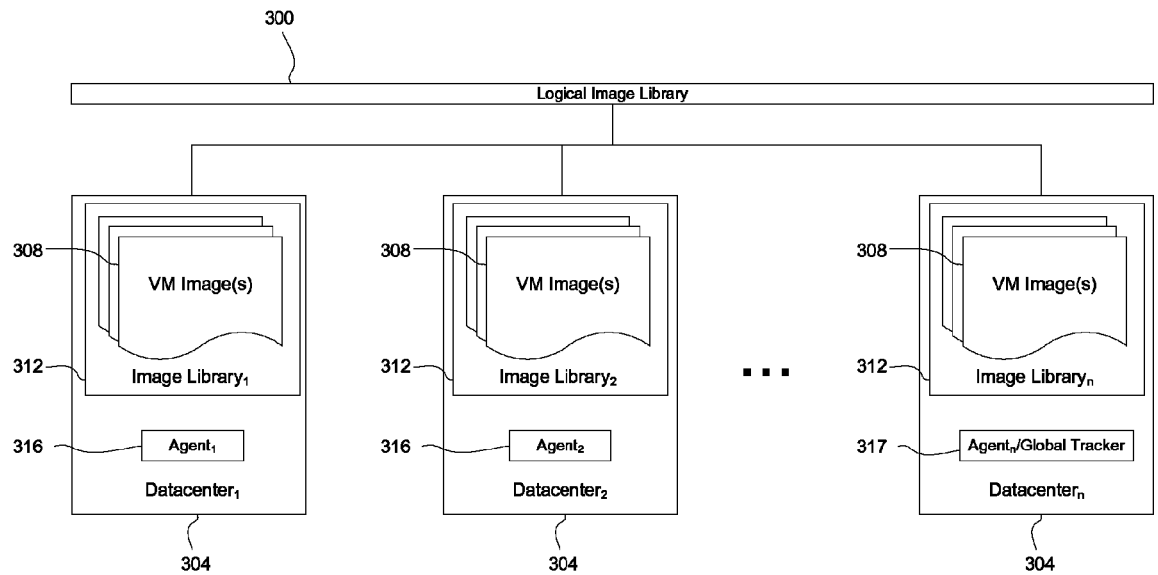
FIG. 3 is a schematic block diagram of a multi-system environment, wherein each system is as shown in FIG. 1, in accordance with an embodiment of the invention.

Referring now to FIGS. 2-3, a method 200 according to an embodiment of the invention may be deployed over a cloud computing environment comprising {n} datacenters 304, each datacenter 304 functioning as a node 10 as described above. Furthermore, each datacenter 304 contains a collection of virtual machine images ("VM images") 308. An aim of the method 200 is to intelligently and efficiently transfer the VM images 308 between the datacenters 304, when instructed, by: identifying similarities between the VM images 308; determining their availability across the datacenters 304; and devising an optimal plan for their transfer based on a set of factors including cost, speed, and availability. The method 200 accomplishes this aim in three broad stages: a bootstrap stage 204, in which the VM images 308 are tracked and organized to form a Logical Image Library 300; a maintenance stage 220, in which the Logical Image Library 300 is tracked and organized periodically, or after changes have been made, or both; and an operational stage 240, in which VM images are transferred between the datacenters 304, or are otherwise modified.

The method 200 initiates the bootstrap stage 204, wherein the method 200 processes the VM images stored on the datacenters 304. Each datacenter 304 comprises a collection of VM images 308 forming a local Image Library 312, an Agent 316 that tracks information about the local Image Library 312. The $n^{th}$ datacenter 304 further comprises a Global Tracker 317, which, in addition to tracking information about the VM images stored locally on the $n^{th}$ datacenter, also tracks information about the VM images on all Image Libraries 312, across the datacenters 304, which collectively form the Logical Image Library 300.

Figures 5, 6:
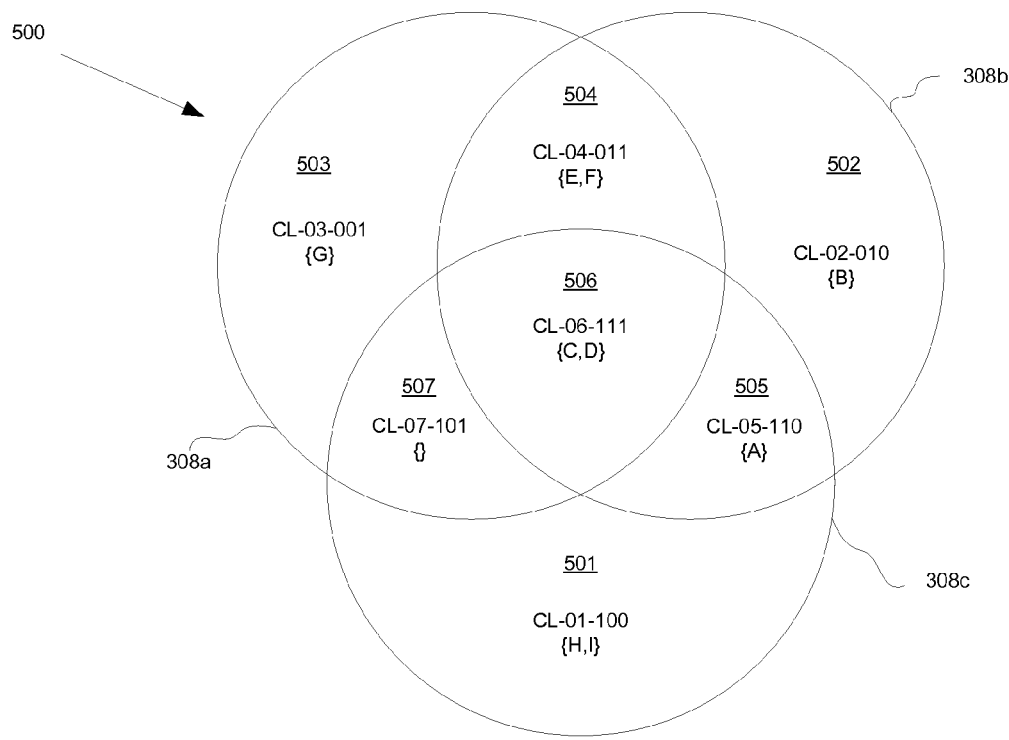
FIG. 5 is an intersection diagram of the virtual machine images shown in FIG. 4, in accordance with an embodiment of the invention.
FIG. 6 is a table showing a similarity matrix corresponding to the virtual machine images depicted in FIG. 4 and the intersection diagram depicted in FIG. 5, in accordance with an embodiment of the invention.

The processing is performed in step 208, wherein the method 200 analyses each VM image 308 across the Logical Image Library 300 to create "clusters". A cluster (an example of which is shown in FIG. 5) may be represented using a cluster identifier, a set of metadata comprising at least a set of calculated hash values associated with data block sets residing on one or more VM images 308, and may further include: an integer representing the total number of blocks within the hash value that are shared amongst the VM images 308 associated with the cluster; a block number array containing the data block numbers within the VM images 308 associated with the hash value; and an array functioning as an index to the block number array. The clusters do not contain the actual data blocks with which they are associated. Each cluster is identified using a binary bitset representation, where the length of the bitset equals the total number of distinct VM images 308 present on the Logical Image Library 300, with each bit representing one of the VM images 308, and set as described below.

According to the disclosed embodiment, analyzing each VM image 308 in step 208, as described above, includes creating a content digest for each processed VM image 308. A content digest is a collection of information about a VM image 308 that contains: a hash code signature for each data block in the VM image 308$r$; the number of data blocks in that VM image that share the hash code (representing the internal redundancy of a data block, i.e. the number of times the same data block appears in the VM image 308); and a list of data block numbers (representing the data block positions within the VM image 308). Information from the content digest is used to create a "singleton cluster", i.e. a cluster that contains the hash codes for all data blocks present in the given VM image 308. Once the singleton cluster is created, it is added to an indexed cluster list, which is tracked by the Global Tracker 317. Furthermore, a Bloom filter is maintained to facilitate an efficient comparison of the hash codes to avoid resource-intensive comparisons except in the case of a false positive determination. The hash code signatures are stored in ascending order to facilitate a binary search in case of false positives.

In step 208, each created singleton cluster is compared to each existing cluster, i.e. each cluster that is already tracked by the Global Tracker 317 (where no existing clusters are present, the singleton cluster is added to the cluster list maintained by the Global Tracker 317). More specifically, if a singleton cluster does not share any data blocks with an exiting cluster, the bitset for the existing cluster is updated to reflect a (0) in the bit corresponding to the VM image 308 represented by the singleton cluster. Conversely, if the singleton cluster shares all its data with the existing cluster, the bitset for the existing cluster is updated with a (1) in the appropriate bit position. If the singleton cluster shares only some of its represented data blocks with the existing cluster, then the existing cluster is split to form two clusters; one for the shared data blocks, and one for the unshared data blocks. A new bitset is assigned to each newly formed cluster.

In step 216, the method 200 tracks the buildup and transformations of the clusters, using the Global Tracker 317. Accordingly, the method 200 generates and updates a similarity matrix (an example of which is shown in FIG. 6), in step 216, that contains the generated information about how data blocks are shared among the VM images 308, and which of the datacenters 304 they reside on, using a cluster list and an index list. The method 200 further retains lists of identifiers, file paths, size, status, cost, time, and availability information associated with each cluster, VM image 308, and datacenter 304, using the Global Tracker 317.

Figure 4:
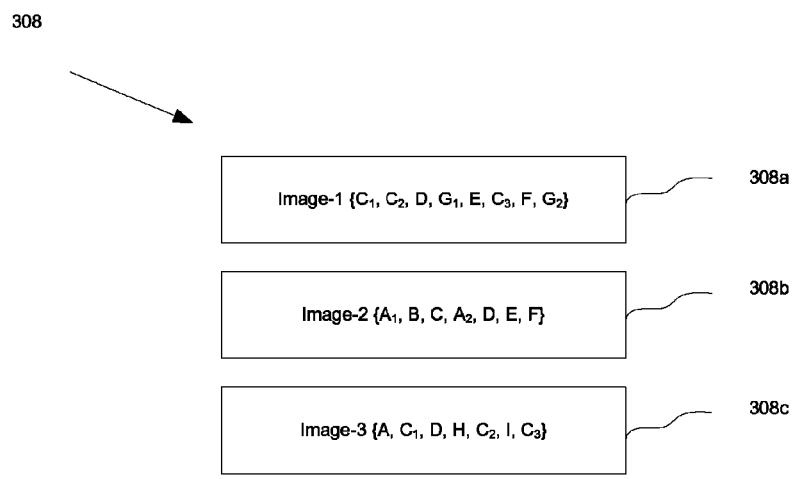
FIG. 4 is a schematic block diagram of virtual machine images that may reside on one or more systems shown in FIGS. 1 and 3, in accordance with an embodiment of the invention.

Referring now to FIG. 4, an example of a collection of three VM images 308, tracked and organized by the method 200 in the bootstrap stage 204, may reside as one or more copies on one or more of the datacenters 304. The depicted VM images 308a -c are {Image-1, Image-2, Image-3}, and contain data blocks {A, B, C, D, E, F, G, H, I}. A subscript is appended to data blocks that are stored redundantly in the same VM image 308. For example, data block C appears twice in Image-1, once in Image-2, and thrice in Image-3, and is denoted accordingly by a subscript in each of the depicted VM images 308.

Now referring to FIG. 5, the method 200, via step 208, clusterizes the VM images 308a-c shown in FIG. 4. The clusterized VM images 308a-c are shown in an intersection diagram 500. Seven depicted clusters 501-507 ("the clusters") are labeled CL-01 through CL-07 respectively, cluster 507 being empty (i.e., there are no data blocks that are exclusively shared between cluster 507's constituent VM images), and each is further labeled using a unique bitset. The number of bits in the bitset is equal to the number of VM images 308 in the Logical Image Library 300; in this case, three. Each bit in each of the bitsets {001, 010, 100, 011, 110, 101, 111} represents one of the three VM images 308a-c shown in FIG. 4. According to the present embodiment, the most significant bit of each set represents Image-3 308c, the second most significant bit represents Image-2 308b, and the least significant bit represents Image-1 308a.

According to the depicted embodiment, the hash values used by step 208 to form each cluster are calculated secure hash algorithm 1 codes ("SHA-1 code" or "SHA-1 signature"), and are 20 bytes per 4096-byte sized data blocks in the VM images 308. However, other embodiments may implement other hash functions and other data block sizes (for example, SHA-256, SHA-384, SHA-512, or MD5; 512 bytes, 1 kilobyte, 2 kilobyte, 8 kilobyte data block sizes). Similarly, in an environment where data storage resources are limited or expensive, a shorter hash code may be used to conserve storage space, whereas a longer hash code can reduce hash collisions at the cost of storage space and higher computation cost in an environment where the added cost is not prohibitive. Data block sizes larger than file system block sizes cause internal fragmentation and result in loss of sequentiality of file system blocks reducing the redundancy between images. The selection of a hash code function and data block size, then, may vary and can be influenced by factors such as particular VM image types, file systems, computing environments, and computing resources, without departing from the spirit and scope of the disclosed invention.

Further referring to FIG. 5, in the depicted example, cluster 503 has the bitset 001; it contains the SHA-1 signature and other relevant information corresponding to data block {G}, which is found only on Image-1 308a. Therefore, the least significant bit of the corresponding bitset is (1), and the rest are (0). Similarly, cluster 506 has the bitset 111, because its constituent data blocks, {C, D}, are shared between all three depicted VM images 308a-c. While a VM image 308 may contain multiple copies of a given data block, as for example is the case with data block {C} in Image-1 308a and Image-3 308c, the internal redundancy increases neither the number of clusters generated nor the number of corresponding hash codes within that cluster (although the cluster may contain additional metadata indicating multiple locations within a given VM image 308 where a particular data block resides).

Now referring to FIGS. 2 and 6, the method 200 generates a similarity matrix 600 for the VM images 308 depicted in FIG. 4, which are clusterized in step 208. For illustration purposes, FIG. 6 shows the similarity matrix 600 in two sections: an upper section 604a corresponding to the singleton clusters 501-503, each representing blocks present in only one of the depicted VM images 308a-c; and a lower section 604b corresponding to a set of 3 additional clusters 504-506, each representing blocks shared between two or more of the depicted VM images 308a-c. Cluster 507, depicted in FIG. 5, is not included in the similarity matrix 600 because it does not correspond to any data blocks in any image. Furthermore, in any Logical Image Library 300 with VM images 308 {1-n}, it is preferable to limit the number of clusters tracked and organized using the similarity matrix 600, to the top (n) clusters, even if more clusters are initially generated. Maintaining more than the top (n) clusters in the similarity matrix 600 may become prohibitive. Top (n) clusters are those that represent the most number of shared data blocks, the largest sized shared data blocks, or both. According to another embodiment of the invention, the number of the clusters tracked by the method 200 using the similarity matrix 600 is configurable. Such an embodiment can take advantage of particular characteristics of a given cloud computing environment, where additional efficiencies can be found by maintaining additional clusters, or where the added cost of maintaining such additional clusters is not prohibitive. Furthermore, what constitutes a top cluster may also be configurable.

Additionally in step 216, the method 200 also tracks cluster size information 612, i.e. the size of data blocks represented by each cluster. In the depicted example, cluster 4, which represents data blocks {E, F}, is 376 MB in size; meaning that transferring cluster 4 from one datacenter 304 to another would require transferring 376 MB of data blocks.

The method 200 further implements a maintenance stage 220, wherein the method 200 detects changes to the Logical Image Library 300 or the datacenters 304, or is initiated by the method's 200 other steps after changes are made. In either instance, the method 200 determines those changes in step 224, and updates the similarity matrix and its clusters in step 228.

More specifically, changes to the Logical Image Library 300, or the datacenters 304, may occur for many reasons, including, without limitation: user input, such as when a user directs the method 200 to transfer or copy a VM image 308 from a source datacenter to a target datacenter, or to remove a VM image 308; or it may include automatic updates that may be required when a datacenter becomes or is suspected of becoming unavailable or difficult to access.

As stated, an aim of the method 200 is to facilitate an intelligent and efficient transfer of data blocks from one data center to another. Through the bootstrap stage 204 and the maintenance stage 220, the method 200 creates and maintains the information that facilitates reaching this aim. The method 200 is therefore equipped to accept instructions to modify the Logical Image Library 300 in step 240, by adding, removing, or transferring (or a combination thereof) a VM image 308.

When the method 200 is instructed to add or remove a VM image from a datacenter 304 in step 240, the method 200 processes the instruction and initiates the maintenance stage 220 so that information maintained by the Global Tracker 317, including the similarity matrix, is updated to indicate if the newly added VM image 308 shares any data blocks with other VM images 308 on any of the datacenters 304; or to indicate if any data blocks referenced by existing clusters are no longer available on a removed VM image (if removed entirely) or on a particular datacenter 304 (if removed only from that datacenter 304).

When the method 200 is instructed to transfer a selected VM image 308 ("selected image") from a source datacenter 304 ("source datacenter") to a target datacenter 304 ("target data-center"), the method 200 identifies all the clusters needed to reconstitute the selected image, using the similarity matrix 600, in step 252. For example, if instructed to transfer Image-3 308c (shown in FIG. 3) from the source datacenter (not shown) to a target datacenter (not shown), the method 200 identifies clusters 501, cluster 505, and cluster 506 (shown in FIGS. 5 and 6) as corresponding to the data blocks necessary to reconstitute Image-3 308c on the target datacenter. The method 200 does so by using the information maintained by the Global Tracker 317 (which includes the similarity matrix 600, and contains information about the VM image 308a-c, every cluster 501-506, and every datacenter 304).

Furthermore, in step 256, the method 200 determines, by using the similarity matrix and the associated information maintained by the Global Tracker 317, which VM images 308 and which datacenters 304 each cluster identified in step 252 contain the identified clusters. In the above example, the method 200 determines that cluster 501 exists in Image-3 308c; cluster 505 exists in Image-2 308b and Image-3 308c; and cluster 506 exists in Image-1 308a, Image-2 308b, and Image-3 208c. The method 200 also determines which datacenters 304 contain each of the above identified VM images 308. Each identified VM image 308 may be shared, i.e. it may reside on more than one datacenter 304. Therefore, each of those VM images 308, and each of the datacenters 304 they reside on, may serve as a source for the corresponding data blocks.

As illustrated by the above example, although the method 200 receives instructions to transfer Image-3 308c from the source datacenter to the target datacenter, it may not be necessary to make a transfer at all if all of Image-3's 308c constituent data blocks already reside on the target datacenter as constituent data blocks of other VM images 308. Additionally, to the extent that Image-3 308c does not share constituent data blocks with the VM images 308 on the target datacenter, it may nevertheless share some or all of its constituent data blocks with the VM images 308 on other datacenters. Under either scenario, the method 200 may be able to reconstitute the selected image on the target datacenter without transferring any data blocks to the target datacenter at all, or by transferring some or all of the necessary data blocks from a datacenter other than the source datacenter. These options allow the method 200 to use be selective in the resources it uses, such as bandwidth and speed of transfer, to make the transfer and reconstitution of the selected image more efficient, as compared to a direct transfer method.

More specifically, as it relates to the above example, the target datacenter may already store Image-1 308a and Image-2 308b. Consequently, data blocks represented by cluster 506, which is shared between Image-1 308a, Image-2 308b, and Image-3 308c, need not be transferred to the target datacenter, and are marked as existing thereon in step 264. Otherwise, the method 200 determines if there is yet any other datacenter 304 that contains the data blocks necessary for transfer, in step 268. Therefore, the copies already on the target datacenter (as part of Image-1 308a and Image-2 308b) may be used to reconstitute Image-3 308c on the target datacenter. Where data blocks belonging to Image-3 308c are not already on the target datacenter, they may nevertheless be on another datacenter from which a transfer may be faster or less costly than if the user-identified source datacenter were used. If the user-identified source datacenter is the only available source, then it is selected as the source to be used in step 276.

In step 272, the method 200 determines an optimal plan for transferring and reconstituting the selected image, i.e., its constituent data blocks, on the target datacenter. The optimal transfer plan is configured to meet the needs of the particular embodiment in which it is employed, and may include user-defined parameters. According to an embodiment of the disclosure, the optimal plan is derived, in part, by determining the time and bandwidth required to transfer each data block from each potential donor datacenter to the target datacenter, where such a transfer is necessary. No transfer is necessary with respect to those data blocks that already exist on the target datacenter. The selection of which datacenter to use as a donor for a given cluster or set of data blocks is made by minimizing the sum of the products of three factors: time, bandwidth, and cost, for the data blocks transferred from donor datacenters; subject to a policy which may be pre-configured or defined by a user. More specifically, the above steps may be represented by a function, as follows: $\min_{\{i,j\}}\{\max_{\{i,j\}}*\alpha*\sigma*+[1-\alpha]*\Sigma_{j=1}^{D}B_j*i_j*\rho_j\}$, such that $$\sum_{i=1}^{c} r_{i,j}*S_i*e_{i,j} - B_j*t_j = 0,$$

for j=1, . . . , D;

$$\sum_{j=1}^{D} r_{i,j}*e_{i,j} - 1 = 0,$$

for i=1, . . . , C; $r_{i,j} \geq 0$, for i=1, . . . , C and j=1, . . . , D; and $t_j \geq 0$ for j=1, . . . , D; where the above referenced parameters and variables are defined as follows:

| Input Parameter | Description |
| --- | --- |
| C | Number of clusters to be downloaded to the target datacenter |
| D | Number of donors |

-continued

| Input Parameter | Description |
| --- | --- |
| $e_{i,j}$ | Indicator variable, such that it equals 1 if cluster i is available on donor j, for i = 1, . . . , C and j = 1, . . . , D |
| $S_i$ | Size of cluster for i = 1, . . . , C |
| $B_j$ | Bandwidth between target and donor j for j = 1, . . . , D |
| $p_j$ | Cost of data transfer between donor j and the target for j = 1, . . . , D |
| $\sigma$ | Value coefficient for transfer time, i.e., monetary value |
| $\alpha$ | Value between 0 and 1 representing relative importance of time and cost of transfer speed |

| Variable | Description |
| --- | --- |
| $r_{i,j}$ | Fraction of cluster i to be transmitted from donor j |
| $t_j$ | Time required to receive all data from donor j for j = 1, . . . , D |
| t | Time required to receive all data from all donors |

The method 200 determines each of the above values by using the similarity matrix and related information maintained by the Global Tracker 317, and, where appropriate, through user-input. Using the above values and functions, the method 200 identifies the least costly donor to use for each cluster, based on a pre-configured or user-defined emphasis on saving time, or bandwidth.

In step 280, the method 200 transfers all data blocks that are not already on the target datacenter to the target datacenter, using the donor datacenters (which may include the source datacenter) selected in step 272. The transferred data blocks, together with those that may already have existed on the target datacenter, are used to reconstitute the selected image on the target datacenter, in step 284. The reconstitution of the selected image is facilitated by mapping files created using the similarity matrix and other information maintained by the Global Tracker 317.

Thereby, the method 200 for transferring virtual machine images between a plurality of nodes is described above which includes analyzing each of a plurality of VM images 308 present on a plurality of datacenters 304 to create image clusters corresponding to a plurality of data blocks present in the plurality of VM images 308, using the program and computer 12 as shown in FIG. 1. The method 200 generates the similarity matrix 600 using the created image clusters, and selects a VM image 308 present on the source datacenter to be reconstituted on the target datacenter. The method 200 identifies a plurality of data block sets in the selected VM image 308 for transfer and/or reconstitution on the target datacenter, using the similarity matrix. The method 200 further determines an optimal transfer plan for each data block set, and transfers the data blocks in those sets according to the optimal plan. Using the data blocks already existing on the target datacenter, and the data block sets transferred to the target datacenter, the method 200 reconstitutes the selected VM image 308.

Accordingly, implementation of the disclosed invention is highly effective in intelligently allocating system and network resources to transfer unique data block sets (the clusters) between datacenters 304; it has a measured efficiency gain of 50% to 80% in bandwidth consumption and transfer time when compared to existing technologies such as rsync-based transfers. Such high efficiency gains are possible because the disclosed invention takes advantage not only of data redundancy in individual VM images, but also across multiple VM images within a datacenter and across multiple datacenters. Furthermore, the disclosed invention takes into account pre-configured or user-determined preferences. For example, it may allocate a higher bandwidth (at a higher cost) to accommodate a user's preference for immediate availability of a given VM image on a target datacenter. Additional efficiency may be gained by combining features of the disclosed invention with existing solutions, such as source-side deduplication, to eliminate the need to monitor, analyze, and/or clusterize redundant data on any given VM image.

Illustrative environments that may deploy embodiments of the disclosed invention include: a public cloud computing environment comprising multiple datacenters, where a service provider may create a new VM image catalog that requires propagation across the cloud, along with subsequent security updates and patches, or where a client VM image is needed on multiple datacenters for high availability; VM image export/import between different cloud environments or hypervisors; DevOps operations having multiple clouds for the development/testing, staging, and production stages of the DevOps process; and hybrid cloud environments, where a customer's private cloud interacts with a public cloud.

Figure 7:
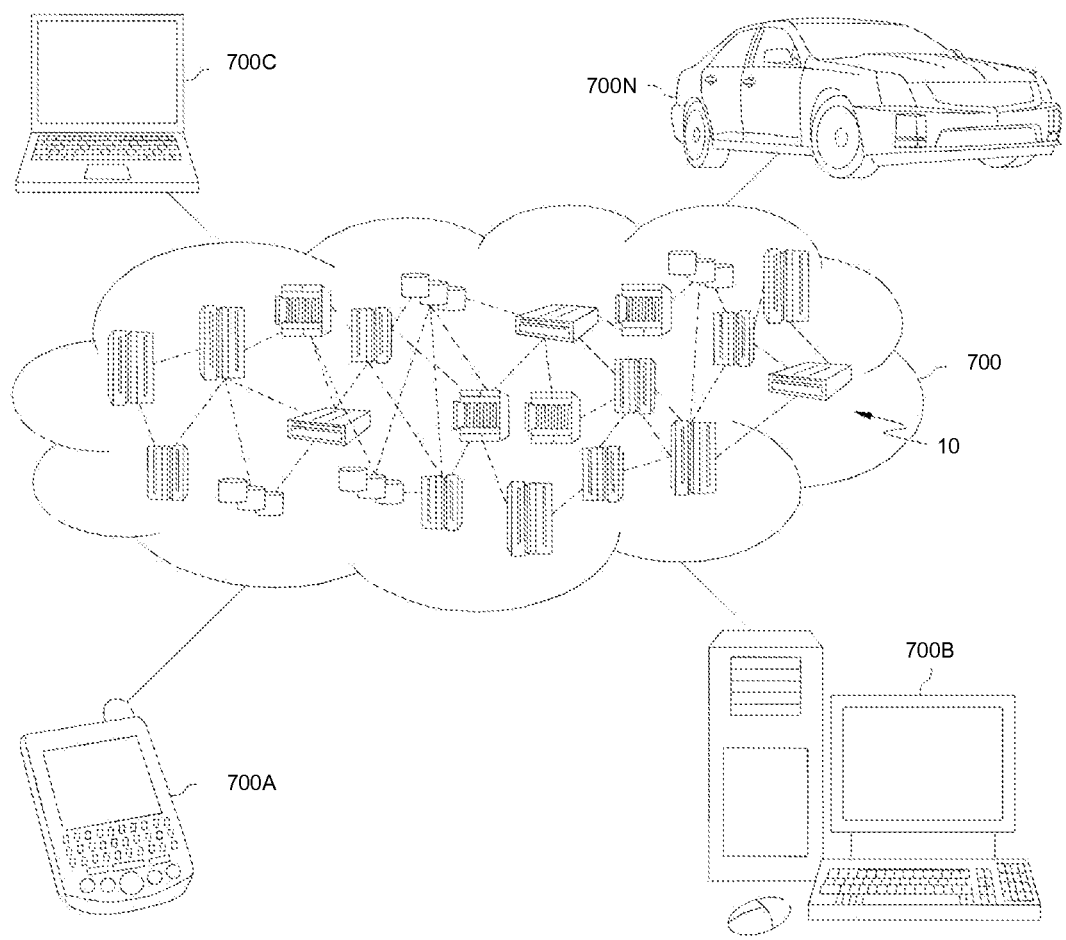
FIG. 7 is a schematic block diagram of an illustrative cloud computing environment, in accordance with an embodiment of the invention.

Referring now to FIG. 7, an illustrative cloud computing environment 700 is depicted. As shown, the cloud computing environment 700 comprises one or more cloud computing nodes 10 with which local computing devices used by cloud consumers, such as, for example, a personal digital assistant (PDA) or a cellular telephone 700A, a desktop computer 700B, a laptop computer 700C, and/or an automobile computer system 700N, may communicate. The nodes 10 may communicate with one another. They may be grouped (not shown) physically or virtually, in one or more networks, such as Private, Community, Public, or Hybrid clouds as described hereinabove, or a combination thereof. This allows the cloud computing environment 700 to offer infrastructure, platforms and/or software as services for which a cloud consumer does not need to maintain resources on a local computing device. It is understood that the types of computing devices 700A-N shown in FIG. 7 are intended to be illustrative only and that the computing nodes 10 and the cloud computing environment 700 can communicate with any type of computerized device over any type of network and/or network addressable connection (e.g., using a web browser).

Figure 8:
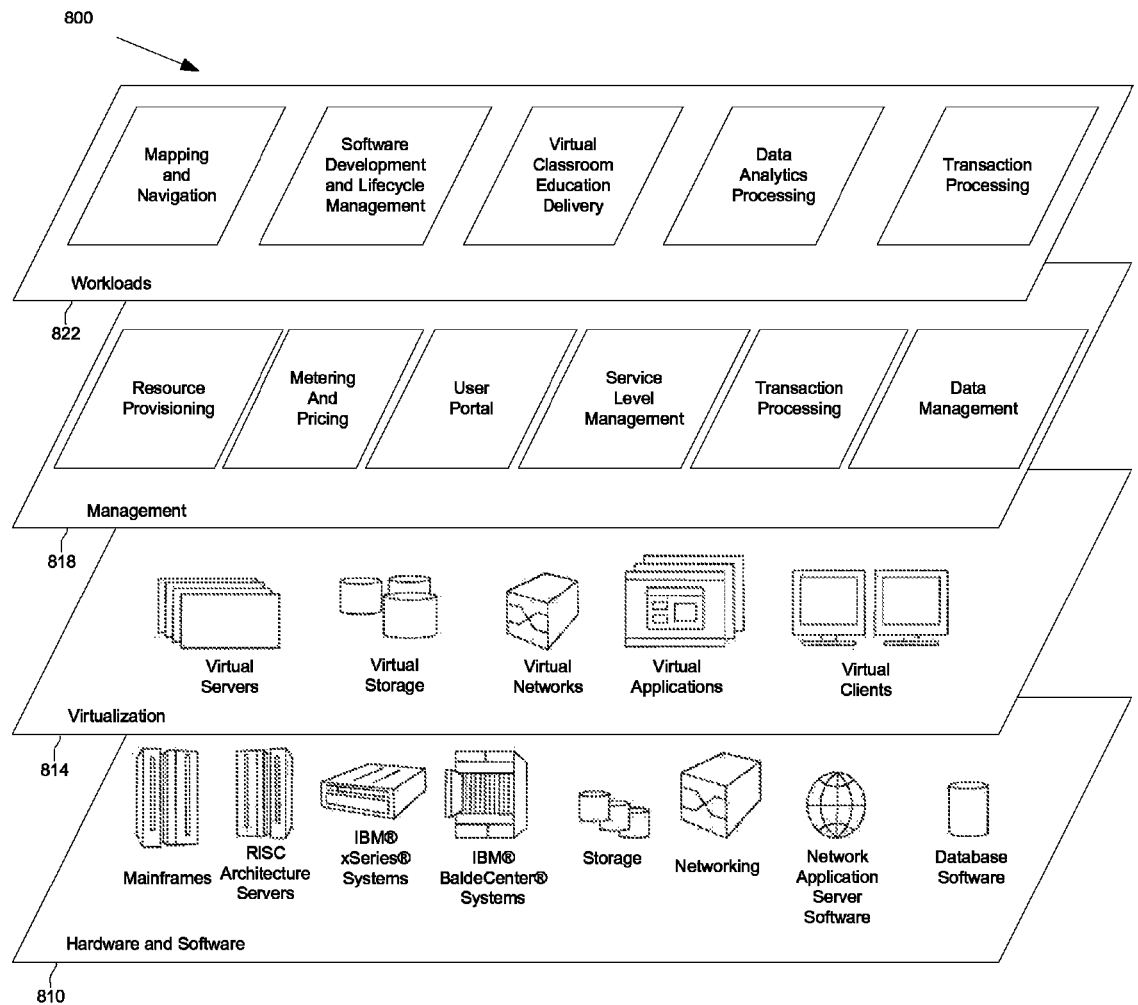
FIG. 8 is a schematic block diagram for a multi-layered functional illustration of the cloud computing environment depicted in FIG. 7, in accordance with an embodiment of the invention.

Referring now to FIG. 8, a set of functional abstraction layers provided by the cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided.

The hardware and software layer 810 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer 814 provides an abstraction layer from which the following examples of virtual entities may be provided: virtual servers; virtual storage; virtual networks, including virtual private networks; virtual applications and operating systems; and virtual clients.

In one example, the management layer 818 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 822 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a management system for transferring VM images 308, such as the method 200.

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a nonexhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for transferring virtual machine images between a plurality of nodes, comprising:
   analyzing each of a plurality of virtual machine images present on a plurality of nodes to create image clusters corresponding to a plurality of data blocks present in the plurality of virtual machine images, using a program executable by a processor communicating with a computer, the plurality of nodes including a source node and a target node, wherein each image cluster is associated with a grouping of data blocks and comprises a list of hash codes of the data blocks and further comprises an image cluster identifier;
   generating a similarity matrix using the created image clusters;
   selecting a virtual machine image present on the source node to be reconstituted on the target node;
   identifying a plurality of data block sets in the selected virtual machine image for transfer to the target node, using the similarity matrix;
   transferring the plurality of data block sets to the target node, according to an optimal transfer plan; and
   reconstituting the plurality of data block sets on the target node using at least the transferred plurality of data block sets,
   wherein the image cluster identifier comprises a bit string having a length at least equal to a count of the plurality of virtual machine images, wherein each bit corresponds to one of the plurality of virtual machine images, and each bit having a value of (1) indicates that the image cluster is present on its corresponding virtual machine image.

2. The method of claim 1, wherein the data block sets are distributed on a plurality of nodes.

3. The method of claim 1, wherein the data block sets are on both the source node and the target node.

4. The method of claim 1, wherein the data block sets are only on the source node.

5. The method of claim 1, further comprising:
   identifying a first data block set from the selected virtual machine image that are present only on the source node;
   identifying a second data block set from the selected virtual machine image that are present on the source node, and on at least another node excluding the target node;
   identifying a third data block set from the selected virtual machine image that are present on the source node, and on at least the target node;
   transferring the first and second data block sets from the source node or at least another node, excluding the target node, to the target node, according to an optimal plan; and
   reconstituting on the target node the selected virtual machine image, using the transferred first and second data block sets, and the third data block set present on the target node.

6. The method of claim 1, wherein the plurality of nodes are datacenters within a public or private cloud computing environment.

7. The method of claim 1, wherein the number of image clusters used to generate a similarity matrix is configurable.

8. The method of claim 1, wherein the optimal transfer plan is determined by minimizing a time factor, a bandwidth factor, and a cost factor, using the similarity matrix.

9. The method of claim 1, wherein the plurality of nodes comprises a group of systems categorized by cost and/or bandwidth requirements.

10. A system for transferring virtual machine images, comprising:
    one or more computer having a processor processors;
    one or more non-transitory computer-readable storage device media;
    program instructions embodied on the storage device stored on the non-transitory computer-readable storage media for execution by at least one of the one or more processor processors, the program instructions comprising:
       program instructions to analyze each of a plurality of virtual machine images present on a plurality of nodes to create image clusters corresponding to a plurality of data blocks present in the plurality of virtual machine images, the plurality of nodes including a source node and a target node, wherein each image cluster is associated with a grouping of data blocks and comprises a list of hash codes of the data blocks and further comprises an image cluster identifier;
       program instructions to generate a similarity matrix using the created image clusters;
       program instructions to select a virtual machine image present on the source node to be reconstituted on the target node;
       program instructions to identify a plurality of data block sets in the selected virtual machine image for transfer to the target node, using the similarity matrix;
       program instructions to transfer the plurality of data block sets to the target node, according to an optimal transfer plan; and
       program instructions to reconstitute the plurality of data block sets on the target node, using at least the transferred plurality of data block sets,
    wherein the image cluster identifier comprises a bit string having a length at least equal to a count of the plurality of virtual machine images, wherein each bit corresponds to one of the plurality of virtual machine images, and each bit having a value of (1) indicates that the image cluster is present on its corresponding virtual machine image.

11. The system of claim 10, wherein the data block sets are distributed on a plurality of nodes.

12. The system of claim 10, wherein the data block sets are on both the source node and the target node.

13. The system of claim 10, wherein the data block sets are only on the source node.

14. The system of claim 10, wherein the plurality of nodes are datacenters within a public or private cloud computing environment.

15. A computer program product for transferring virtual machine images, the computer program product comprising:
a non-transitory computer-readable storage medium having program code embodied therewith, the program code readable/executable by a processor to perform a method comprising:
analyzing each of a plurality of virtual machine images present on a plurality of nodes, by the processor, to create image clusters corresponding to a plurality of data blocks present in the plurality of virtual machine images, the plurality of nodes including a source node and a target node, wherein each image cluster is associated with a grouping of data blocks and comprises a list of hash codes of the data blocks and further comprises an image cluster identifier;
generating a similarity matrix, by the processor, using the created image clusters;
selecting a virtual machine image present on the source node, by the processor, to be reconstituted on the target node;
identifying a plurality of data block sets in the selected virtual machine image, by the processor, for transfer to the target node, using the similarity matrix;
transferring the plurality of data block sets to the target node, by the processor, according to an optimal transfer plan; and
reconstituting the plurality of data block sets, by the processor, on the target node using at least the transferred plurality of data block sets,
wherein the image cluster identifier comprises a bit string having a length at least equal to a count of the plurality of virtual machine images, wherein each bit corresponds to one of the plurality of virtual machine images, and each bit having a value of (1) indicates that the image cluster is present on its corresponding virtual machine image.

16. The computer program product of claim 15, wherein the data blocks sets are distributed on a plurality of nodes.

17. The computer program product of claim 15, wherein the data block sets are on both the source node and the target node.

18. The computer program product of claim 15, wherein the data block sets are only on the source node.

19. The computer program product of claim 15, wherein the plurality of nodes are datacenters within a public or private cloud computing environment.

20. The computer program product of claim 15, wherein the number of image clusters used to generate a similarity matrix is configurable.

21. The computer program product of claim 15, wherein the optimal transfer plan is determined by minimizing a time factor, a bandwidth factor, and a cost factor, using the similarity matrix.

22. The computer program product of claim 15, wherein the one or more additional segments, for a given image cluster in the image clusters, comprise one or more of:
a number of blocks value;
an array based on the number of blocks value; and
an index array associated with the given image cluster.

23. The method of claim 1, wherein the image cluster identifier comprises one or more of:
a number of blocks value;
a block number array; and
an index array.

24. The method of claim 1, wherein generating a similarity matrix further comprises:
identifying n columns, wherein n is a count of virtual machine images in the plurality of virtual machine images;
identifying m rows, wherein m is a count of virtual image clusters;
generating a matrix of at least n columns and at least m rows, wherein the table is populated with bit strings of the virtual image cluster identifiers.

* * * * *